(12) United States Patent
Crochat (10) Patent No.: US 10,864,989 B2
(45) Date of Patent: Dec. 15, 2020

(54) ADAPTATIVE WIND TURBINE

(71) Applicant: Philippe Crochat, Chenereilles (FR)

(72) Inventor: Philippe Crochat, Chenereilles (FR)

(73) Assignee: Philippe Crochat, Sant Etienne (FR)

( * ) Notice: Subject to any disclaimer, the term of this patent is extended or adjusted under 35 U.S.C. 154(b) by 1036 days.

(21) Appl. No.: 15/304,220

(22) PCT Filed: Apr. 15, 2015

(86) PCT No.: PCT/EP2015/058133
§ 371 (c)(1),
(2) Date: Oct. 14, 2016

(87) PCT Pub. No.: WO2015/158754
PCT Pub. Date: Oct. 22, 2015

(65) Prior Publication Data
US 2017/0036761 A1  Feb. 9, 2017

(30) Foreign Application Priority Data

Apr. 16, 2014 (FR) .................... 14 53397

(51) Int. Cl.
*F03D 13/20* (2016.01)
*B64C 39/02* (2006.01)
(Continued)

(52) U.S. Cl.
CPC .......... *B64C 39/024* (2013.01); *B64C 11/003* (2013.01); *B64C 27/16* (2013.01); *B64C 39/022* (2013.01); *F03D 1/0608* (2013.01); *F03D 13/20* (2016.05); *B64C 2201/042* (2013.01); *B64C 2201/108* (2013.01); *F05B 2220/706* (2013.01); *F05B 2240/2021* (2013.01); *F05B 2240/92* (2013.01); *F05B 2240/923* (2013.01);
(Continued)

(58) Field of Classification Search
CPC ..... F03D 13/20; B64C 11/003; B64C 39/022; B64C 2201/108; Y02E 10/727; Y02E 10/72; Y02T 70/5254; F05B 2240/92; F05B 2240/2021
See application file for complete search history.

(56) References Cited

U.S. PATENT DOCUMENTS 5,171,127 A    12/1992  Feldman et al.
7,183,663 B2 *  2/2007  Roberts .................. F03D 13/20
                                                                290/44
(Continued)

FOREIGN PATENT DOCUMENTS

EP    2 562 084 A1    2/2013
FR      578 074 A      9/1924
(Continued)

OTHER PUBLICATIONS

International Search Report, dated Jul. 31, 2015, from corresponding PCT Application.

*Primary Examiner* — Timothy D Collins
*Assistant Examiner* — Keith L Dixon
(74) *Attorney, Agent, or Firm* — Anemis Keebno Logius (57) ABSTRACT

A drone with a horizontal rotor includes one or more rotor(s) (115, 116) which rotate in a horizontal plane, each rotor (115, 116) being equipped with one or more rigid or non-rigid blades (120, 121), the blade end being mounted on an electric motor (110, 111) with a propeller.

19 Claims, 3 Drawing Sheets

(51) Int. Cl.
*F03D 1/06* (2006.01)
*B64C 11/00* (2006.01)
*B64C 27/16* (2006.01)

(52) U.S. Cl.
CPC ....... *F05B 2240/931* (2013.01); *Y02E 10/721* (2013.01); *Y02E 10/725* (2013.01); *Y02E 10/727* (2013.01); *Y02T 70/5254* (2013.01)

(56) References Cited

U.S. PATENT DOCUMENTS

| | | | | |
|---|---|---|---|---|
| 7,317,261 | B2* | 1/2008 | Rolt | B64C 39/022 290/55 |
| 7,675,189 | B2* | 3/2010 | Grenier | F03D 15/00 290/54 |
| 8,350,403 | B2* | 1/2013 | Carroll | B65H 75/4402 290/55 |
| 2003/0230898 | A1 | 12/2003 | Jamieson et al. | |
| 2006/0093483 | A1* | 5/2006 | Brueckner | F03D 1/02 416/132 B |
| 2010/0032947 | A1* | 2/2010 | Bevirt | F03D 1/065 290/44 |
| 2010/0221112 | A1* | 9/2010 | Bevirt | F03D 5/00 416/135 |
| 2010/0295320 | A1* | 11/2010 | Bevirt | B64C 39/022 290/55 |
| 2011/0121570 | A1* | 5/2011 | Bevirt | F03D 5/06 290/44 |
| 2011/0215582 | A1* | 9/2011 | Parera | F03D 9/25 290/55 |
| 2011/0260462 | A1* | 10/2011 | Vander Lind | A63H 27/002 290/55 |
| 2011/0266809 | A1* | 11/2011 | Calverley | F03D 5/00 290/55 |
| 2011/0272527 | A1* | 11/2011 | Larson | F03D 13/20 244/155 A |
| 2012/0104763 | A1* | 5/2012 | Lind | B64C 31/06 290/55 |
| 2014/0021723 | A1* | 1/2014 | Christy | F03D 9/007 290/55 |
| 2017/0241403 | A1* | 8/2017 | Spencer | F03D 13/20 |
| 2018/0066633 | A1* | 3/2018 | Bojanovich | F03D 7/06 |

FOREIGN PATENT DOCUMENTS

| | | |
|---|---|---|
| WO | 02/086312 A1 | 10/2002 |
| WO | 2010/039790 A2 | 4/2010 |

* cited by examiner

ADAPTATIVE WIND TURBINE

FIELD OF THE INVENTION

The present invention relates to a wind turbine comprising at least one blade on which is positioned a generator, the radius of rotation of the blades relative to the support structure being adapted according to the wind speed.

The aim of the invention is notably to optimize the power/cost ratio of a wind turbine in order to significantly lower the wind energy production cost.

STATE OF THE ART

As is known, a wind turbine consists of a mast, a nacelle containing the electric generator and a rotor generally consisting of three blades 120° apart. Most of the conventional wind turbine masts have a braced or lattice form, or even tubular form.

The maximum power P produced by a wind turbine is as follows:

$$P = \frac{\rho}{2} * V^3 * S * \frac{16}{27} \quad (1)$$

In which $$\frac{16}{27}$$

is the Betz limit and corresponds to me maximum theoretical efficiency, S is the surface swept by the wind turbine and V is the speed of the wind and $\rho$ the density of the air.

It is also known that, in order to achieve the Betz limit and thus extract the maximum power from the wind, a blade element must have approximately a cord length C of the following form:

$$C = \frac{16\pi R}{9\lambda^2 B \frac{r}{R}} \quad (2)$$

in which:
R is the sweep radius of the wind turbine
B is the number of blades
Lambda is the ratio of blade end speed to wind speed ("tip speed ratio" or tsr)
r/R is the position on the blade of our element, at 1 it is on the end of the blade, at 0 it is at the hub level, at 0.5 it is in the middle of the blade.

Now, given that the manufacturing cost of a blade element is substantially proportional to the volume of material of which it is made and that this volume is proportional to the square of the cord, the equation (2) indicates to us that the manufacturing cost (dcost) of this blade element is inversely proportional to the square of the position of our blade element on the blade.

I.e. dcost∝

$$1 / \left(\frac{r}{R}\right)^2$$

Moreover, our blade element covers a surface area $$dS = 2\pi \left(\frac{r}{R}\right) R,$$

and as according to the equation (1), the power is proportional to the surface area swept, therefore the generated power dP of our blade element is proportional to the position thereof on the blade.

I.e.

$$dP \propto \frac{r}{R}$$

The power/cost ratio is therefore $$\propto \left(\frac{r}{R}\right)^3$$

Current research attempts to improve the energy efficiency of wind turbines while reducing the cost thereof. Now, in order to optimize the power/cost ratio of a wind turbine, it would be better to address the blade end rather than the blade base.

In order to limit the costs and the complexity of the mechanics of the wind turbine, the players in this field are, wherever possible, increasingly turning to the choice of a permanent magnet generator directly engaged with the blades. Thus, the need for a gear system is dispensed with.

However, all other things being equal, a generator becomes all the more expensive when its rotation speed is low. There is therefore an interest in finding a system which makes it possible to both retain the direct drive while ensuring a high rotation speed.

A wind turbine with secondary rotors is a conventional horizontal axis wind turbine in which the current generator is migrated from the hub to the end of each of the blades. Furthermore, each of the secondary generators is equipped with a propeller in order to rotate said generator. The international patent application No WO 02/086312 A1 discloses this type of wind turbine.

Another international patent application No WO 2010/039790 A2 discloses a wind turbine comprising secondary generators equipped with propellers, this wind turbine floating in the air in the manner of a rotary kite.

For a wind turbine of swept surface area $S_0$, the power produced by the wind turbine is given by the following formula: $\rho \times S_0 \times V^3 \times Cp_0$ in which $\rho$ is the density of the air, V is the wind speed and $Cp_0$ is the power coefficient of the so-called conventional wind turbine.

A $Cp_0$ equal to 0 would mean a wind turbine of zero energy efficiency. Conversely, a $Cp_0$ equal to 1 would mean a wind turbine of 100% energy efficiency, that is to say a wind turbine which manages to pick up all the wind energy. In practice, any wind turbine, whatever its form and its construction, is limited by the Betz limit to a theoretical value of $$\frac{16}{27},$$

or approximately 59%. The same applies for a wind turbine equipped with secondary rotor(s).

Let $\lambda$ be the ratio between the blade end speed and the wind speed, called tsr (tip speed ratio); T the sum of the thrust forces of the secondary rotors.

Then $$T\lambda V = \frac{\rho}{2}S_0 V^3 Cp_0 \qquad (3)$$

This equation can be seen as being the equality between the energy produced by the blades and the energy harvested by the secondary rotors.

$$\frac{\rho}{2}S_0 V^3 \qquad (3.1)$$

is nothing more than the power of the wind passing through the surface area swept by the wind turbine.

From the equation (3) is taken $$T = \frac{\rho S_0 V^2 Cp_0}{2\lambda} \qquad (4)$$

Now, the theory of the "actuator disc" (the wind turbine as a first approximation forms a porous disk) teaches us that T is also equal to:

$$T = n\rho\lambda^2 V^2(1-\alpha)2\alpha S_1 \qquad (5)$$

In which n represents the number of secondary rotors (or the number of blades if there is only a single secondary rotor installed on each of the blades) and $S_1$ is the surface area swept by a rotor, assuming here that each secondary rotor is identical. Finally, $\alpha$ is the attenuation of the wind speed. The form of the rotor wake and the wind speeds far upstream of the wind turbine, level with the wind turbine and far behind the wind turbine are known.

Assuming $$\alpha = \frac{S_1}{S_0}$$

(ratio between the surface area swept by a secondary rotor and the surface area swept by the blades), (4) and (5) give $$(1-a)4a = \frac{Cp_0}{n\lambda^3\alpha} \qquad (6)$$

Now the same theory of the "actuator disc" teaches us that the power P harvested by the set of secondary rotors is $$P = n\rho(1-\alpha)^2 2\alpha\lambda^3 V^3 S_1 \qquad (7)$$

Injecting (6) into (7) gives $$P = \frac{\rho}{2}(1-a)S_0 Cp_0 V^3 \qquad (8)$$

Knowing that the power coefficient of our wind turbine (equipped with secondary rotors) that we denote $Cp_1$ is the ratio between the power P harvested by the set of secondary rotors and the power of the wind; (3.1) and (8) gives $$Cp_1 = \frac{P}{\frac{\rho}{2}S_0 V^3} = (1-a)Cp_0 \qquad (9)$$

In which $Cp_0$ is the power coefficient of our wind turbine if it had not been provided with secondary rotors, that is to say if the electric current generator had been placed in the hub.

Moreover, solving the equation (6) gives $$a = \frac{1}{2} \pm \sqrt{\frac{1}{4} - \frac{Cp_0}{4n\lambda^3\alpha}}$$

in which only the solution $$a = \frac{1}{2} - \sqrt{\frac{1}{4} - \frac{Cp_0}{4n\lambda^3\alpha}} \qquad (6.1)$$

is physically possible.

Injecting (6.1) into (9), gives $$Cp_1 = \frac{1}{2}\left(1 + \sqrt{1 - \frac{Cp_0}{n\lambda^3\alpha}}\right)Cp_0 \qquad (9.1)$$

From (9.1) we can draw the following conclusions:

Since the term within the route is necessarily less than 1 then $Cp_1 < Cp_0$. A wind turbine with secondary rotors is therefore necessarily less energy efficient than a conventional wind turbine.

However, since $n\lambda^3\alpha \gg Cp_0$ then $Cp_1 \cong Cp_0$

Thus, if the mechanical parameters of the wind turbine with rotors are sufficiently well chosen, the energy efficiency of such a wind turbine would be similar to that of a conventional wind turbine.

SUMMARY OF THE INVENTION

The present invention aims to remedy the drawbacks of the prior art mentioned above.

To this end, the present invention relates, in its most general acceptance, to a wind turbine comprising at least one blade linked by a connecting means to a support structure, a generator being fixed to at least one blade, said connecting means being linked to the support structure by a hub and each blade being able to rotate, characterized in that the radius of rotation of each blade is adapted according to the wind speed.

That makes it possible to vary S in the equation (1) and thus adapt the surface area swept by the wind turbine relative to the wind speed in order to obtain a produced power close to the maximum power regardless of the wind speed.

In embodiments, the wind turbine is linked by a cable to a support structure able to be raised relative to the ground by means of motors and elements ensuring a lift in air. That makes it possible to make the wind turbine according to the invention airborne.

In embodiments, said connecting means is a cable. That creates a low wind resistance and makes it possible to reduce the system manufacturing costs.

In embodiments, the radius of rotation of said blades can be adapted according to the wind speed by virtue of a winder. That makes it possible to obtain a greater or lesser blade sweep surface area and thus produce more or less electricity, the production of electricity being proportional to the blade sweep surface area.

In other embodiments, said connecting means is a bar. That also makes it possible to reduce the system manufacturing costs.

In other embodiments, the radius of rotation of said blades can be adapted according to the wind speed by virtue of telescopic means. That makes it possible to obtain a greater or lesser blade sweep surface area.

In embodiments, said generator is fixed at the blade end.

In embodiments, said support structure is a mast.

In other embodiments, said support structure is a kite. That makes it possible to exploit stronger winds at altitude and therefore increase V in the equation (1). Furthermore, that allows the rotation of the blades of the wind turbine in a vertical plane. This rotation in a vertical plane is particularly innovative in the field of airborne wind turbines. In effect, the airborne wind turbines of the prior art are forced to perform a rotation in an oblique plane in order to ensure a lift in air. The rotation in a vertical plane of the airborne wind turbine that is the object of the present invention is permitted by virtue of the fact that the lift in air of the wind turbine is assured by the support structure which is able to be raised into the air, for example the kite. The rotation in a vertical plane ensures the passage through the wind turbine of a greater mass of air and generates a better electricity yield compared to a wind turbine performing a rotation in an oblique plane.

In embodiments, a boat comprises the airborne wind turbine according to the invention. That makes it possible to power the motor of the boat.

In embodiments, the blades of the wind turbine rotate in a vertical plane. That ensures the passage through the wind turbine of a greater mass of air and generates a better electricity yield compared to a wind turbine performing a rotation in an oblique plane.

BRIEF DESCRIPTION OF THE DRAWINGS

The invention will be better understood on reading the following description and on studying the figures accompanying it. These figures are given only to illustrate the invention, but in a nonlimiting manner.

DETAILED DESCRIPTION OF EMBODIMENTS OF THE INVENTION

Figures 1, 2:
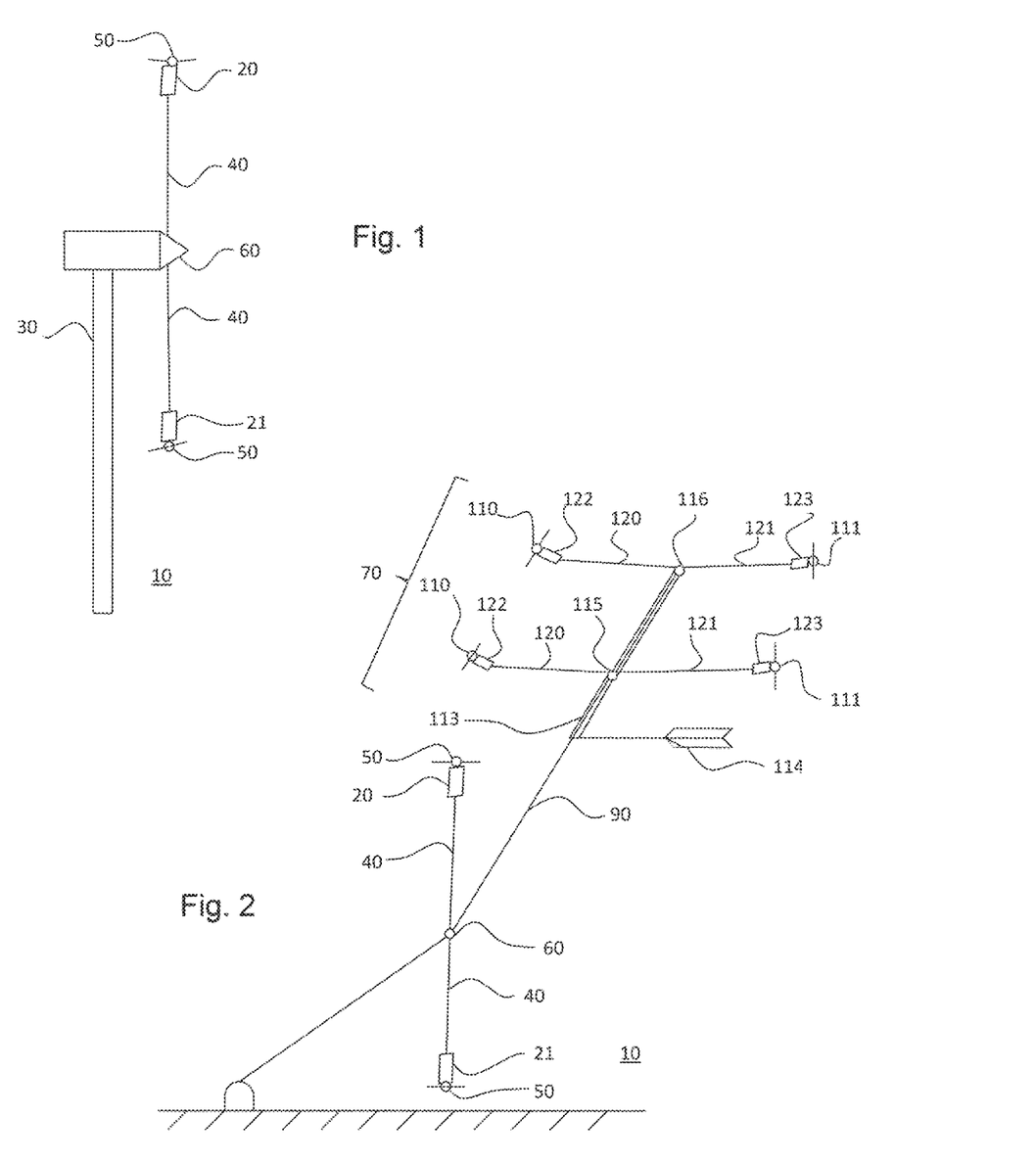
FIG. 1 illustrates a wind turbine with rotation radius that can be adapted according to the wind speed, the support structure of which is a mast, according to an embodiment of the invention.
FIG. 2 illustrates an airborne wind turbine with rotation radius that can be adapted according to the wind speed, linked to a support structure that can be raised into the air by means of motors and elements ensuring a lift in air, according to an embodiment of the invention.

FIG. 1 shows a wind turbine 10 comprising a mast as support structure 30, two blades 20, 21 linked by a connecting means 40 to said support structure 30 and a generator 50 fixed to each blade 20, 21. Said connecting means 40 is linked to the support structure 30 by a hub 60 and said blades 20, 21 are able to rotate, the radius of rotation of said blades 20, 21 being adapted according to the wind speed.

In the embodiments in which the support structure 30 is a mast and the connecting means 40 are not rigid, the wind turbine is not placed into the wind but downwind, in order to avoid contact between the blades and the mast. Furthermore, the blade elements are kept in place by virtue of the centrifugal force.

In the embodiments in which the wind turbine 10 comprises only a single blade 20, a counterweight linked to the hub 60 is placed diametrically opposite the blade 20.

The connecting means 40 can be a cable or else a bar in materials appropriate to the wind sector. When the connecting means is a cable, it is essential for the blade to have a self-stabilizing profile to ensure a stability of the aerodynamic angle of incidence of the blade.

The generators 50 can be placed anywhere on the blades 20, 21 and preferably at blade end. Each of the generators is equipped with a propeller in order to rotate said generator.

Figure 4:
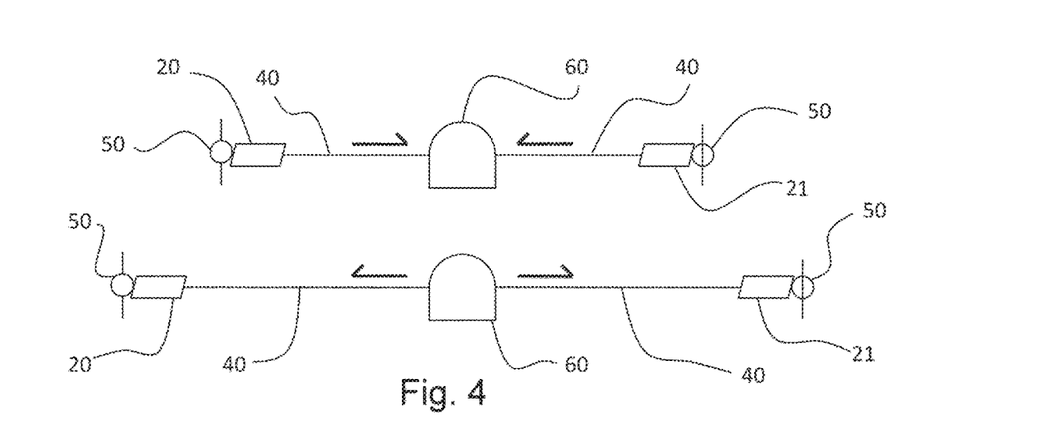
FIG. 4 illustrates an adaptation of the rotation radius of the blades of a wind turbine, according to an embodiment of the invention.

To allow the adaptation of the radius of rotation of the blades 20, 21, it is possible to use a winder when the connecting means 40 is a cable. Such a movement adapting the radius of rotation of the blades 20, 21 is illustrated in FIG. 4. In effect, a winder, for example positioned in the hub 60, makes it possible, by unwinding or winding the connecting means 40, to increase or reduce the radius of rotation of the blades 20, 21 and therefore vary the production of electricity. Another means of adapting the radius of rotation of the blades 20, 21 is the use of telescopic means. That is notably feasible when the connecting means (40) is a bar.

FIG. 2 shows an airborne wind turbine 10 linked by a cable 90 to a support structure 30 that can be raised relative to the ground by means of motors 110, 111 and elements 115, 116, 120, 121, 122, 123 ensuring a lift in air. Such a support structure 30 can correspond to a rotary kite 70, said to be of helicopter type.

Several types of kite can be used to keep the wind turbine in the air. The kites can be rigid or flexible, rotary or fixed. With the lift in air being assured by the kite, the wind turbine does not need to have a lift role and the blades thereof can therefore rotate in a vertical plane, in order to obtain a sweep surface area passed through by a greater mass of air and generate a better electricity yield compared to a wind turbine rotating in an oblique plane.

Such a rigid kite is the kite in rhomboid form which still graces the play of children. An example of a flexible kite is the "kitesurf" kite which day by day gains in popularity and performance. Less known because it is more complex but no less efficient is the rotary kite. One or more blade(s) rotate about a center of rotation linked to the earth by a cable. The very large surface area swept by this type of kite ensures a lift much greater than the fixed kites with equal apparent surface area.

Two subtypes of rotary kite can be identified, those with the rotor slightly inclined into the wind and those with the rotor strictly horizontal.

The kite with rotor slightly inclined into the wind is nothing more than an autogiro linked to the earth by a cable. One very interesting example of this type of kite was used in the second world war, the Focke-Achgelis Fa 330.

This type of kite in fact uses the force of the wind to rotate the blades which in turn generate the lift. This type of kite does not require any motor to operate, but with the drawback of having a catastrophic spurious aerodynamic drag and difficulty in starting.

The kite with strictly horizontal rotor can be likened more to the helicopter and has blade(s) which rotate in a perfectly horizontal plane. The latter model requires the use of motors which consume energy but has an excellent lift/drag ratio and can start on its own and land and take off vertically, an electronic control device, for example positioned in the hub or on the ground or else on the blades, can be added thereto in order to obtain a perfect stability even in the case of turbulent wind.

All these types of kites can be used to bear the wind turbine according to the present invention. Hereinbelow, the solutions that can be envisaged for each of these types are presented.

The rigid or semi-rigid kite is the best known, consisting of a rigid structure (skeleton) and fabric to cover the surface. A kite of stabilized "airplane wing" type is also a rigid kite. It is not the form of the kite which determines its type but the manner in which it is constructed. In order to increase its lift, it will be advisable to have it sweep a large surface area by having it describe the widest possible trajectory. This type of kite requires the use of a long boom allowing the kite to "catch the wind" in its initial take-off phase. An alternative solution to the take-off boom would consist in adding a balloon (or dirigible) inflated with a gas that is lighter than air in order to permanently lift the kite in air even in the absence of wind. In order to limit the volume of helium included, the sole function of this balloon will be to lift the kite (which has a very low weight). This kite, which has to move constantly, requires a control system on the ground using several cables. This type of kite cannot therefore be used in our case unless it is combined with a system of controls coupled with a multitude of sensors and driving motors or actuators.

Figure 3:
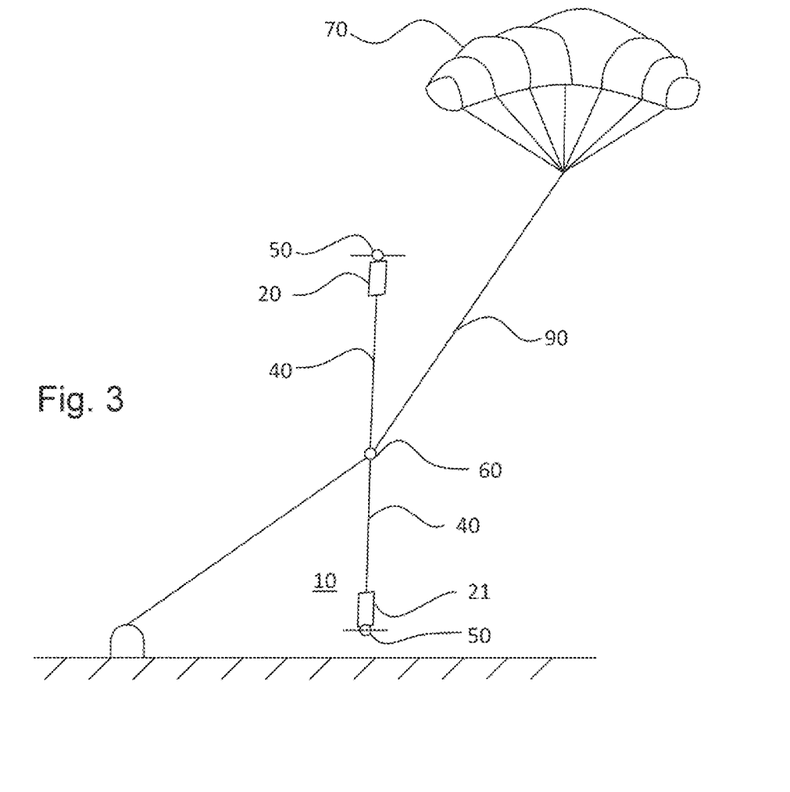
FIG. 3 illustrates an airborne wind turbine with rotation radius that can be adapted according to the wind speed, the support structure of which is a kite, according to an embodiment of the invention.

The flexible kite has become widely available through the kitesurf phenomenon; it is a kite made entirely of fabric provided with box sections which inflate by virtue of the incident wind. This type of kite can be seen as a paraglider sail linked to the earth via a cable. The take-off and landing system is fairly complicated and has already been developed by the companies Skysail (registered trademark) and Kitegen (registered trademark). The fact that these kites describe figures of eight in the sky increases the lift of the kites, but reduces the aerodynamic efficiency because of the increased spurious drag. A wind turbine 10 equipped with such a kite 70 according to the invention is illustrated in FIG. 3.

With regard to rotary kites, the kite of autogiro type is not a serious candidate because of the enormous aerodynamic drag that it generates and its inability to take off vertically. Only the so-called helicopter type kite will be discussed.

The so-called helicopter type kite (with strictly horizontal rotor), as illustrated in FIG. 2, consists of one or more rotors 115, 116. In the case of a single rotor, in order to ensure the stability of the kite 70, an electronic device for cyclically varying one of the aerodynamic parameters (leading angle of the blades, travel, blade-hub distance, etc.) combined with the presence of at least one sensor, must be added (as in the case of a conventional helicopter). In the case of contra-rotating rotors, a device controlling the speed of rotation of the two or more rotors (speed which will not be the same on all the rotors) is added, which causes the stability on one axis to be assured under the effect of the incident wind. On the other axis, the stability is assured by a horizontal empennage.

The wind turbine provided with such a device then consists of a cable linking it to the ground, a central hub 60 rotating about the cable, and one or more rigid or non-rigid connecting means 40, each connecting means being linked to a blade 20, 21, which is twisted or not. On at least one blade, a generator 50 is mounted which is equipped with a propeller operating on startup as propulsive propeller, and then as current generator 50. Such a propeller must have a strictly symmetrical profile. This generator 50 can therefore be used as motor (assisting in startup) and as current generator 50. The electricity produced by the generator(s) passes through the connecting elements. the hub and the cable linked to the ground. In one embodiment, said central hub 60 is equipped with a winder making it possible for the assembly to be unwound or wound in order to vary the radius of rotation of the device. This wind turbine 10 is itself linked by a cable 90 to a rigid structure consisting of a rigid axis 113 and possibly an empennage 114. One or more rotors 115, 116 rotate about the rigid axis 113 of the structure. Each of these rotors 115, 116 is equipped with one or more rigid or non-rigid blades 120, 121, equipped at blade end with a wing 122, 123, mounted on a motor 110, 111 with a propulsive propeller. The blades 120, 121, the wings 122, 123 and the rotors 115, 116 have only a lift role (kite) and do not contribute to the generation of electricity. The motors 110, 111 of the kite of helicopter type are powered by the wind turbine 10 and/or the electrical network. Each of the rotors 115, 116 of the kite can be equipped with a winding, unwinding device in order to vary the radius of rotation of each blade which is linked thereto.

In one embodiment, the wind turbine 10 according to the present invention is equipped with a winder situated in the hub 60 and/or on the ground, which makes it possible, in the take-off and landing phases, to accommodate and release the kite. The structure of the kite and that of the wind turbine will be one after the landing. The lift into the air will be made by virtue of the rotation of the blades of the kite. This rotation generates the lift as in the case of a conventional helicopter.

The take-off phase is performed according to the sequencing of the following steps:
Initially, the so-called helicopter-type kite and the wind turbine with vertical rotor form a solid assembly. All the cables are completely wound and the kite occupies the top position of this assembly.
Electricity from the network is injected into the kite, its motors set the two rotors rotating, which, by rotating, provide centrifugal force to the blades which gradually move away from the hub of their rotor. The more these blades move away from the hub, the more quickly they rotate and the more lift they produce. From a certain moment, this lift is greater than the weight of the assembly which then rises into the air.
By rising into the air, the main cable which links the wind turbine to the ground and the cable which links the wind turbine to the kite are gradually unwound. The kite assembly 70 then moves away from the wind turbine assembly.
On reaching a certain altitude, electricity is injected into the motors of the wind turbine which start to rotate, and by rotating, a centrifugal force is created which causes the cables of the blades to unwind from the wind turbine.

On reaching a certain diameter which is a function of the measured wind, the unwinding of the cables of the blades of the wind turbine is blocked, and the motors of the wind turbine convert to generator mode to produce current and inject a small portion of this current into the so-called helicopter type kite and a large portion of this current into the electrical network.

The landing phase is performed according to the sequencing of the following steps:

When the measured wind becomes too low, the generators of the wind turbine are stopped, and the winders of the wind turbine wind the cables of the blades of the wind turbine.

Once the wind turbine is fully wound, the motors of the kite slow down and the winders wind the cables of the blades of the kite, which reduces the lift and, after a certain moment, the lift of the kite is lower than the weight of the wind turbine which causes a loss of altitude.

By losing altitude, the cables linking the wind turbine to the ground and the wind turbine to the kite are wound. On reaching the ground, all the cables are wound and the motors/generators are stopped.

The wind turbine 10 according to this last embodiment is in a stable state aerodynamically, but it must nevertheless be attached to a device for controlling the winding and the unwinding of the cable. The length of the unwound cable is a function of the altitude reached, of the wind speed and of the distance which separates the wind turbine from the kite.

Figure 5:
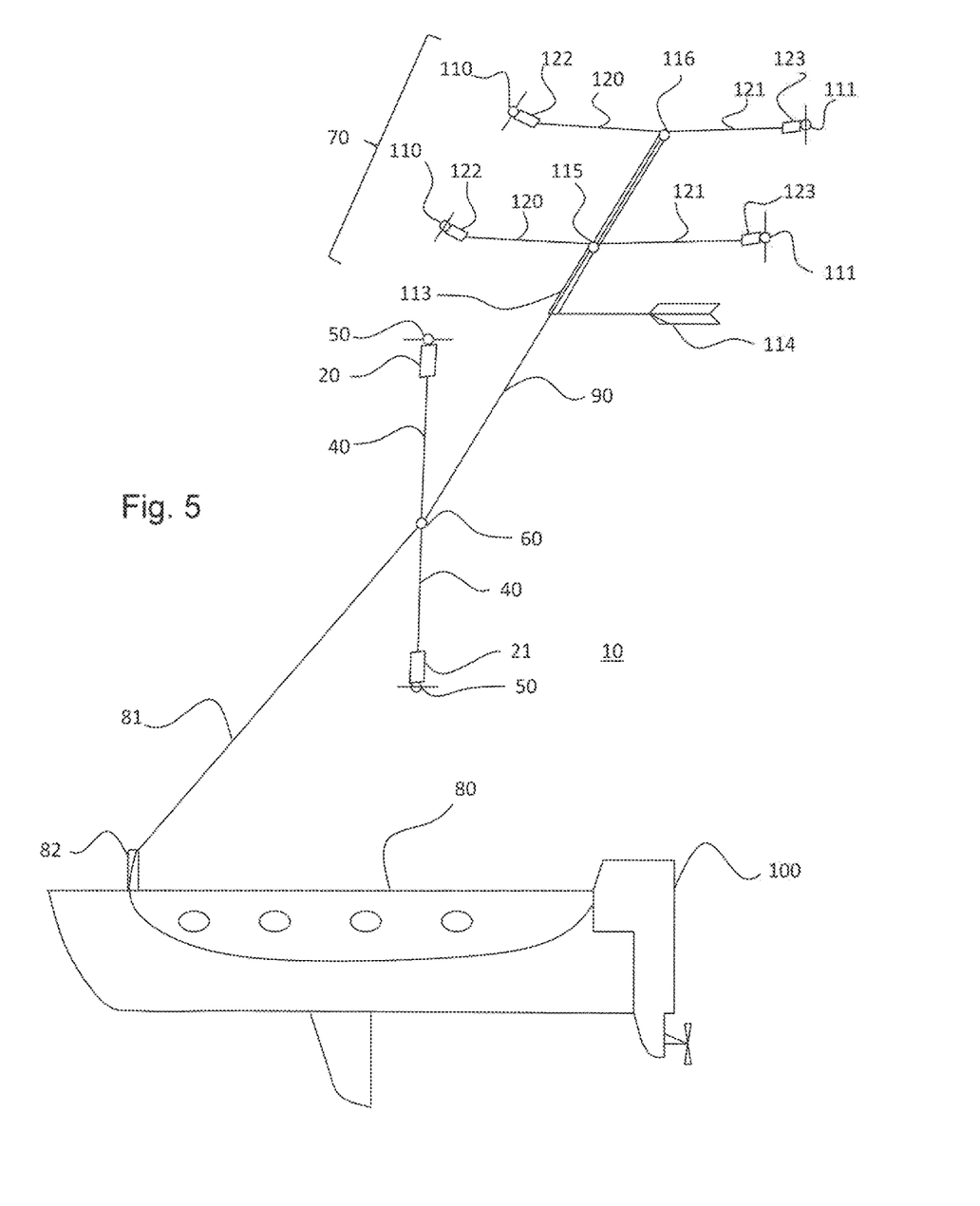
FIG. 5 illustrates a boat comprising an airborne wind turbine according to an embodiment of the invention.

An airborne wind turbine 10 according to the invention, that is to say when the support structure is a kite 70, can be linked to a boat 80 thus producing the electricity powering the motor 100 propelling the boat as is illustrated in FIG. 5. It can be linked to the boat 80 by a cable 81. The point of anchorage 82 to the boat can be situated anywhere. The electricity passes through the cable 81, the anchoring point 82 and to the motor 100 of the boat 80.

Nonlimiting examples of dimensions and characteristics of the wind turbine according to the invention:

Wind turbine intended for the consumer market:
nominal power: 3 kw
hub altitude: 40 m
diameter of the main vertical rotor: 5 m
number of blades: 2
number of generators: 2 (1 installed at the end of each of the blades)
nominal power of each of the generators: 1.5 kw
length of a blade: 1 m
unwound length of the cable securing each of the blades 1.5 m
constituent material of the blade: resin/glass or carbon fiber composite
constituent material of the cable: polyethylene of very high molar mass, copper (high performance polyethylene is situated in the middle of the cable and is used for the mechanical strength of the cable, the copper for the electrical conductivity).

Wind turbine intended for the electricity supplier market:
nominal power: 3 MW
hub altitude: 250 m
diameter of the main vertical rotor: 150 m
number of blades: 2
number of generators: 2 (1 installed at the end of each of the blades)
nominal power of each of the generators: 1.5 MW
length of a blade: 35 m
unwound length of the cable securing each of the blades 40 m
constituent material of the blade: resin/carbon fiber composite
constituent material of the cable: polyethylene of very high molar mass, copper (the high performance polyethylene is situated in the middle of the cable and is used for the mechanical strength of the cable, the copper for the electrical conductivity).

In order for the leading angle of the blades to always be at the desired value, there is either the possibility of using a so-called "self-stabilizing" wing profile, or to use a rear empennage installed at the end of each blade. The profile of self-stabilizing type offers the advantage of being more compact than the "wing+stabilizer" assembly but offers a lesser lift and stability.

The winders bear a cable serving both as electrical conductor and for mechanical traction. No known electrical cable manufacturer offers an electrical and mechanical cable which offers all of the advantages of a good electrical conductor, small bending radius and high tensile strength. Thus, it is more advantageous to put in place two dedicated winders rather than one general winder. Instead of a winder of large diameter which is powerful and heavy for each blade, it is advantageously proposed to use, on the one hand, a winder of large diameter, light and of low power as electrical winder and, on the other hand, a small, light and powerful winder for the mechanical traction cable. The two winders are synchronized with one another by embedded electronics programmed for this purpose. The mechanical cable can consist of aramid fibers, and the electrical cable can be that used for machine tools which withstands a large number of winding windings.

The helicopter-type kite, just like the wind turbine, gains by also having an adaptive radius of rotation, therefore being equipped also with winders situated in its hub.

Such an arrangement allows it, once deployed, for the same consumed power, to raise a heavier load. Or else, for the same raised load, to consume less and therefore make the "wind turbine+kite" assembly more energy efficient.

Such an arrangement allows the helicopter-type kite to be used as captive "drone". Or else, via the incorporation of batteries, to be used as a conventional "drone".

Such a drone offers significant competitive advantages in terms of range, stability and lifting force. In other words, such an aerodynamic lift means with rotating wings offers commercial openings other than simple lifting of a wind turbine.

The mechanical traction cable, or the electrical cable, even if its diameter is reduced to the minimum, provokes a not inconsiderable loss of energy due to the spurious aerodynamic drag that it generates. This loss is due to the form of its profile (round) which is disadvantageous. There is the possibility of producing a flexible electrical cable with wing profile form, offering a drag coefficient of the order of 0.04. This figure is to be compared to the drag coefficient of 0.5 of the conventional round cable. The industrial method used to produce such a cable is "extrusion" which consists in injecting plastic between the copper filaments of the electrical cable. Once the electrical cables are secured to the plastic jacket (which at the same time acts as electrical insulator between the conductor cables), the desired outer form can be obtained. A perfectly aerodynamic airplane wing profile can thus be obtained. This method is valid only for the electrical cable.

The mechanical cable remains separate. The drag generated by the latter is negligible because it has a very small apparent diameter compared to that of the electrical cable.

With regard to the propeller of the generators/motors of the wind turbine and of the supporting kite, it has been discovered in the invention that the vortex generated at wing end is a spurious eddy generated by the lift of a blade/wing; this vortex would generate an additional spurious aerodynamic drag. To remedy this, it is possible to choose to have the propellers situated at blade end rotate in the reverse direction of the blade end vortex. The vortex is thus reduced. The vortex rotates from the lower surface to the upper surface of the wing, so the small secondary rotors have to rotate in the reverse direction thereof.

The vortex generated by the blade and the eddy flow generated by the propeller represent two air flows which are undesirable and which tend to cancel each other out.

Regarding the motors/generators of the wind turbine and of the supporting kite, these motors, in order to ensure a maximum power/weight ratio, will advantageously be of the "in-runner" type, that is to say having permanent magnets on the rotor and not the stator. Such a configuration has the advantage of being more energy efficient, less expensive and more lightweight.

Regarding the dynamic rotor balancing method, the two or more blades being deployed independently of one another, if one blade is deployed more than another, that will create an imbalance which can culminate in the destruction of the wind turbine. To remedy this, it is possible to proceed in two ways:
1. placing an accelerometer on the frame and a position sensor (Hall effect or optical sensor: this sensor sends a pulse, each time the blade passes in front of it), the accelerometer sends a signal that is characterized, once filtered, by an amplitude and a phase. The amplitude is proportional to the quantity of the imbalance observed. The phase indicates the position of the imbalance. This phase therefore makes it possible to determine the blade causing the imbalance.
2. Measuring the instantaneous current consumed by each of the motors on the winder. Since each motor has the same specification, if one of the motors consumes a greater current than the others, that indicates that the blade that it retains is pulling more than the other blades. This blade is therefore responsible for the imbalance.

Once the blade responsible for the imbalance is identified, it is sufficient to rewind its winder or deploy the other blades to reduce the overall imbalance. This procedure is repeated as many times as necessary until an imbalance that is as low as is desired is obtained.

The invention claimed is:

1. A drone comprising: one or more first rotors which rotate in a horizontal plane, each first rotor comprising one or more rigid or non-rigid first rotor blades; a first end of each of said first rotor blades being mounted on a hub and a second end of each of said first rotor blades comprises a second rotor which rotates in a vertical plan, said second rotor comprising one or more propeller blades.

2. The drone as claimed in claim 1, in which the blade end is equipped with a wing.

3. The drone as claimed in claim 1, which comprises telescopic means that make it possible to adapt the radius of rotation of each said first rotor blades.

4. The drone as claimed in claim 1, in which each of the first rotors (115, 116) is equipped with a winding, unwinding device in order to vary a radius of rotation of each first rotor blade which is linked thereto.

5. The drone as claimed in claim 4, in which the winding, unwinding device is in a hub.

6. The drone as claimed in claim 1, in which the propellers rotate in a reverse direction to the first rotor blade end vortex.

7. The drone as claimed in claim 1, in which the motors are permanent magnet motors.

8. The drone as claimed in claim 1, comprising a single first rotor and an electronic device for cyclically varying an aerodynamic parameter of said first rotor, and further comprising at least one sensor to ensure stability of the drone.

9. The drone as claimed in claim 1, comprising two or more first rotors and a device for controlling a speed of rotation of said two or more first rotors so as to assure stability on an axis under the effect of an incident wind wherein stability on another axis is assured by a horizontal empennage.

10. The drone as claimed in claim 1, connected by a cable to a wind turbine, said wind turbine comprising at least one turbine blade linked by a connecting means to a support structure, said wind turbine further comprising a generator (50) fixed to at least one of said turbine blades, said connecting means linked to the support structure by a hub and wherein each blade rotates in a vertical plane about the hub according to wind speed.

11. A drone comprising a first rotor with at least one first rotor blade rotating in a horizontal plane about said first rotor, said at least one first rotor blade comprising at least one second rotor rotationally connected to a propeller, said propeller being driven by an electric motor wherein said second rotor and said propeller are mounted at a free end of said at least one rotor blade.

12. The drone as claimed in claim 11, further comprising another first rotor with at least one first rotor blade wherein said first rotor blade comprises a connecting means.

13. The drone as claimed in claim 12, wherein said connecting means is a telescopic connecting means.

14. The drone as claimed in claim 13, wherein said telescopic connecting means comprise at least one connecting cable and a device for winding and unwinding said at least one connecting cable in order to vary a distance from said first rotor blade to an axis of rotation.

15. The drone as claimed in claim 14, further comprising a hub housing said device for winding and unwinding the connecting cable.

16. The drone as claimed in claim 11, wherein the propeller is driven in a reverse direction to a direction of rotation of a vortex generated at the free end of the first rotor blade.

17. The drone as claimed in claim 11, wherein the electric motor is a permanent magnet motor.

18. The drone as claimed in claim 11, comprising a single first rotor and an electronic device for cyclically varying an aerodynamic parameter of said first rotor, and further comprising at least one sensor to ensure stability of the drone.

19. The drone as claimed in claim 11, comprising several first rotors and a device for controlling a speed of rotation of said first rotors to assure stability.

* * * * *